Sept. 22, 1953
J. W. GRAY
2,653,285
ELECTRICAL COMPARATOR CIRCUIT
Filed Aug. 30, 1945
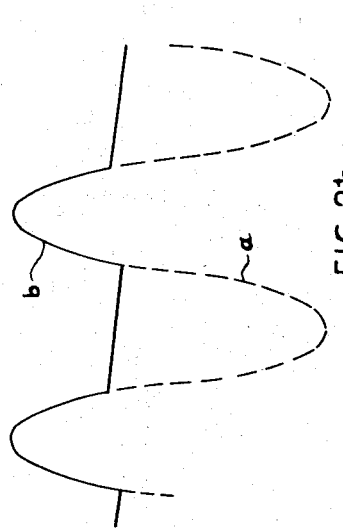
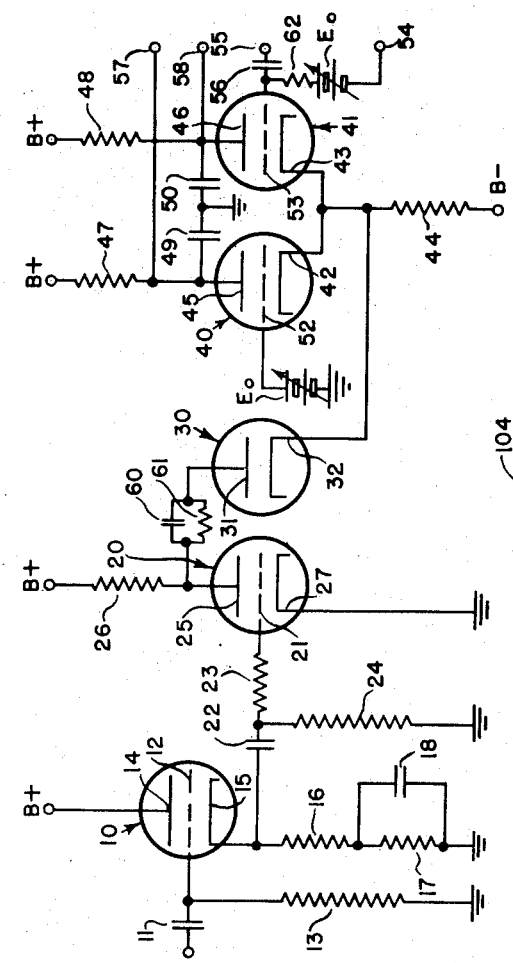
INVENTOR.
JOHN W. GRAY
BY
*William D. Hall.*
ATTORNEY.

Patented Sept. 22, 1953

2,653,285

UNITED STATES PATENT OFFICE 2,653,285

ELECTRICAL COMPARATOR CIRCUIT

John W. Gray, Cambridge, Mass., assignor, by mesne assignments, to the United States of America as represented by the Secretary of War Application August 30, 1945, Serial No. 613,609

15 Claims. (Cl. 318—227)

This invention relates generally to an electrical circuit and more specifically to an electrical comparator circuit.

It is an object of this invention to provide means for comparing a D.-C. voltage with the peak amplitude of an A.-C. voltage to give a D.-C. output voltage indicative of the difference.

Another object is to make the polarity of said D.-C. output voltage indicative of the sense of difference.

Still another object is to provide a D.-C. voltage, the magnitude of which is proportional to the peak amplitude of a controlling alternating voltage.

Yet another object is to provide an alternating voltage, the peak amplitude of which is proportional to the magnitude of a D.-C. controlling voltage.

A further object is to provide a system whereby the comparing means of this invention may be used in a phase-sensitive rate servo system.

Other objects, features and advantages of this invention will suggest themselves to those skilled in the art and will become apparent from the following description of the invention taken in connection with the accompanying drawings in which:

Fig. 1 is a schematic diagram of a circuit embodying the principles of this invention;

Fig. 2 shows waveforms which will be used in the explanation of the operation of this circuit; and Fig. 3 is a block diagram of one use of the circuit of this invention.

Referring more specifically to Fig. 1 there is shown a cathode biased clipper tube 10. An A.-C. reference signal is applied through coupling capacitor 11 to grid 12 of clipper tube 10. Grid 12 is returned to ground through grid resistor 13. Anode 14 of clipper tube 10 is returned to a suitable positive potential, B+. Cathode 15 of tube 10 is returned to ground through cathode load resistor 16 in series with a bias resistor 17 which is shunted with by-pass capacitor 18.

The output of clipper tube 10 is taken from cathode 15 and applied to grid 21 of clamper tube 20 through coupling capacitor 22 and series grid resistor 23. Grid resistor 24 is connected from the common connection of series grid resistor 23 and coupling capacitor 22 to ground. Anode 25 of tube 20 is connected to a suitable positive potential B+ through plate load resistor 26. Cathode 27 of tube 20 is connected to ground.

The output of clamper tube 20 is taken from anode 25 and applied through resistor 61 which is shunted with by-pass capacitor 60 to anode 31 of diode 30. Cathode 32 of diode 30 is connected directly to cathodes 42 and 43 of differential amplifying tubes 40 and 41, respectively. Cathodes 42 and 43 of tubes 40 and 41, respectively, are returned to a suitable negative potential —B through common cathode resistor 44. Anodes 45 and 46 of tubes 40 and 41, respectively, are connected through plate load resistors 47 and 48, respectively, to a suitable positive potential, B+. Anodes 45 and 46 are also by-passed to ground with by-pass capacitors 49 and 50, respectively.

A variable positive direct voltage from supply $E_0$ is applied to grid 52 of amplifier 40. The direct voltage $E_0$ is also applied to grid 53 of amplifier 41 so that it will be added to whatever additional direct voltage is applied to terminal 54. Means are provided for making the voltage $E_0$ on grid 53 equal to the voltage $E_0$ on grid 52.

A second direct voltage (hereafter referred to as the D.-C. input) is applied through terminal 54, and resistor 62 to grid 53 of amplifier 41, said D.-C. input having a polarity and magnitude such that grid 53 is elevated above the potential $E_0$. An A.-C. voltage (hereafter referred to as the A.-C. input) is applied to grid 53 through terminal 55 and coupling capacitor 56, said A.-C. input being 180° out of phase with the reference signal applied to grid 12 of clipper tube 10. The D.-C. output of the circuit appears across terminals 57 and 58 which are connected to anodes 45 and 46 of differential amplifiers 40 and 41, respectively.

In briefly explaining the operation of this circuit, tubes 10, 20, and 30 are for the purpose of applying a negative gate to the cathodes of the differential amplifiers, 40 and 41. The gate appears at the negative peak of the A.-C. input. Tubes 40 and 41 are normally cut off and the application of the negative gate allows these tubes to conduct.

For the interval during which both amplifiers conduct, and the A.-C. and D.-C. inputs are equal, they will cancel, leaving an instantaneous voltage $E_0$ on grid 53 of tube 41. The bias on grid 53 of amplifier 41 will be different from that on grid 52 of amplifier 40, $E_0$, when the negative peak amplitude of the A.-C. input is not equal to the D.-C. input. The D.-C. output of the differential amplifier will be indicative of the inequality of the D.-C. and A.-C. input amplitudes.

For a detailed explanation of the operation of this circuit, reference is now made to the waveforms shown in Fig. 2. The sinusoidal curve indicated at $a$ in Fig. 2a shows the reference signal of reasonably constant amplitude which is applied to the grid of the clipper tube 10. Capacitor 18 in the cathode circuit of clipper tube 10 is sufficiently large so that fluctuations in the voltage produced by variations in the plate current are smoothed out to produce a steady cathode bias voltage. Clipper tube 10 will now conduct during the short interval of the positive peak of the alternating reference signal. The A.-C. component of current appearing at the cathode of the clipper tube 10 will be similar to the solid curve $b$ indicated in Fig. 2a.

The A.-C. component of current shown by curve $b$ will appear at the grid of clamper tube 20 with the slight modifications as explained below. During the positive portion of the A.-C. variation described above, clamper tube 20 will conduct. Grid current will also flow in tube 20 when grid 21 is driven positive and a charge representing a self-bias will remain on the grid. The approximate waveform on the grid will now appear as the solid curve indicated at $c$ in Fig. 2c. The self-bias has caused the signal on the grid of clamper tube 20 to be centered about zero in the manner shown by the curves. The dotted portion $c'$ of Fig. 2c shows the grid signal if grid current did not flow. Since grid current does flow through the series grid resistor 23 during the positive peak of the reference signal, the voltage drop across that resistor causes the signal to be flattened.

During the portion of the cycle when the reference signal is not near its positive peak, the self-biasing effect described above will cause clamper tube 20 to be in a nonconducting state. This action leaves a high positive voltage on anode 25 of clamper 20 and also on anode 31 of diode 30. The effects of the high positive voltage on the anode 31 of diode 30 will be discussed more fully later.

When the reference signal approaches its positive peak, the signal $c$ on the grid of the clamper tube 20 as indicated in Fig. 2c approaches the cutoff bias potential, $-E_c$, of the tube. For the interval during which the signal on the grid of clamper tube 20 is more positive than the cutoff bias, $-E_c$, clamper tube 20 will conduct. Neglecting the resistance of the clamper tube 20, its anode 25 is clamped approximately to ground potential when the tube is conducting.

In the interval during which the clamper tube 20 was nonconducting, the high positive voltage on anode 25 of clamper 20 and therefore on anode 31 of diode 30 causes a current to flow from B+, through load resistor 26, resistor 61, diode 30, and cathode resistor 44 to B—. The large positive voltage developed across cathode resistor 44 due to the above described current flow constitutes a cathode bias sufficient to cut both differential amplifiers 40 and 41 off. Both differential amplifiers are therefore cut off between positive peaks of the A.-C. reference signal.

When the reference signal approaches its positive peak, clamper tube 20 conducts, anode 25 of clamper tube 20 and therefore anode 31 of diode 30 are clamped approximately at ground potential, the diode 30 will stop conducting, and a current from the above described source will no longer flow through cathode resistor 44. Hence the cathode bias on the differential amplifiers will no longer be present and the potential at the cathodes of amplifiers 40 and 41 is free to return to a value determined by the current through the amplifiers.

The above described change in the voltage on the cathode resistor of the differential amplifiers during the positive peak of the reference signal constitutes a negative gate pulse which will cause the amplifiers to conduct. The approximate waveform at the cathodes of both differential amplifiers is shown by wave $d$ of Fig. 2b. Level 75 indicates the direct voltage at the cathode of the differential amplifiers when they are not conducting and level 76 the voltage at the cathodes when the amplifiers are conducting.

A direct voltage, $E_0$, indicated in Fig. 2b, is applied to both grids 52 and 53 of the differential amplifiers. The direct voltage $E_0$ on the grids of the differential amplifiers must be adjusted so that with a voltage on the cathodes of the differential amplifiers as indicated by level 76 of curve $d$, in Fig. 2b, the amplifiers will conduct.

A second direct voltage, indicated as voltages $E_{D.-c.}$ in Fig. 2b is applied to grid 53 of amplifier 41 through terminal 54. This voltage $E_{D.-c.}$ corresponds to the D.-C. input of the amplifier which has previously been described and will add to the direct voltage $E_0$ already on grid 53. The potential on grid 52 of amplifier 40 will be $E_0$ volts and the potential on grid 53 of amplifier 41 will be the same $E_0$ volts plus the D.-C. input voltage $E_{D.-c.}$.

The A.-C. input, already described as being applied to grid 53 of amplifier 41, will be superimposed upon the second direct voltage $E_{D.-c.}$ mentioned above. In Fig. 2b the A.-C. input is indicated by curve $f$.

At the instant the negative gate pulse described above is applied to the cathodes of the differential amplifiers, the amplifiers begin to conduct and compare the amplitude of the A.-C. input with the magnitude of the D.-C. input.

It can be seen in Fig. 2b that when the differential amplifiers are conducting and the magnitude of the D.-C. input $E_{D.-c.}$, is equal to the peak amplitude of the negative half cycle of the A.-C. input, the instantaneous potential left on grid 53 of differential amplifier 41 will be the same as that on the grid 52 of differential amplifier 40, or, in other words, $E_0$ volts. Hence the two tubes will conduct equally and the potential at each anode will be the same. Capacitors 49 and 50 are sufficiently large to prevent the voltage from leaking off the anodes during the nonconducting portion of the differential amplifier cycle and tends to smooth out the D.-C. output from terminals 57 and 58.

When the D.-C. input is equal to the peak amplitude of the A.-C. input, the D.-C. output of the differential amplifiers will be zero. If the A.-C. peak amplitude does not equal the D.-C. input there will be a difference in the potential at the two grids of the differential amplifiers, and hence a D.-C. output will appear across terminals 57 and 58. The output is an indication of the inequality of the input amplitudes, although not necessarily linear with same.

If the polarity of the D.-C. input and the phase of the A.-C. input reverse, the circuit will continue to operate properly as a comparator. In this case, the A.-C. input would be in phase with the reference signal voltage.

This circuit may be used to cause a D.-C. input voltage to follow the peak amplitude of an A.-C. input voltage (control voltage) to the differential amplifier. This may be accomplished by using the output voltage at terminals 57 and 58 as an error voltage to control the D.-C. voltage by a servo or other means.

Alternately, the D.-C. voltage might be considered a control voltage and the D.-C. output voltage at terminals 57 and 58 may be used to cause the peak amplitude of an A.-C. input voltage to follow this control.

Use of this circuit in a rate servo is shown in Fig. 3. The object is to cause the rotational velocity of shaft 105 to be proportional to the peak amplitude of an A.-C. control voltage. An A.-C. control voltage is applied through terminals 106 and 107 to the primary winding of transformer 100. One side of the secondary of transformer 100 is connected through terminal 109 to the positive terminal of a D.-C. source E₀ and thence to ground. The opposite end of the secondary is connected by terminal 108 in series with a D.-C. generator 101 to servo amplifier 102. Servo amplifier 102 may contain the circuit of Fig. 1 along with several additional stages of conventional amplification. In this servo amplifier, the voltage E₀ represents a constant direct voltage, the alternating control voltage represents the A.-C. input, and the generator output represents the D.-C. input, all of which were described in connection with the circuit of Fig. 1. The reference signal voltage is applied to the servo amplifier through terminal 103. The amplified D.-C. output of the servo amplifier is applied to a motor 104 which is mechanically coupled to D.-C. generator 101 by the shaft 105, whose rotational velocity is to be controlled.

The rotational velocity of the shaft will be proportional to the peak amplitude of the A.-C. control voltage when the D.-C. output voltage of the generator is equal to the peak amplitude of the A.-C. control voltage. The D.-C. output is directly proportional to the rotational velocity of the D.-C. generator. The servo amplifier compares the peak amplitude of the A.-C. control voltage with the D.-C. generator output and supplies a correction voltage to the driving motor.

This is a phase-sensitive rate servo circuit since it will handle either positive or negative D.-C. or A.-C. inputs. When the control voltage in Fig. 3 changes phase by 180°, the circuit will operate so that the generator will turn in the opposite direction. Reference to Fig. 2b will indicate this action more clearly. As the polarity of the D.-C. input will now subtract from the constant voltage E₀ and the phase of the A.-C. input is now reversed, the D.-C. and A.-C. input will again buck each other during the positive peak of the carrier when the comparison is made.

It may be practical to adjust E₀ to zero voltage thereby allowing grid 52 of amplifier 40 to be at ground potential and grid 53 of amplifier 41 to be at a D.-C. input voltage E_D.-C. upon which is superimposed an A.-C. input. Then when clamping tube 20 is made conducting its anode voltage will suddenly drop towards ground potential. Since the voltage across condenser 60 cannot drop instantly, anode 31 of diode 30 will be driven below the plate potential of switch tube 20. Hence, conduction through diode 30 immediately ceases and the positive bias on each cathode of amplifiers 40 and 41 is consequently removed. Amplifiers 40 and 41 are therefore allowed to conduct immediately upon receiving the negative gate pulse. The values of condenser 60, resistors 26, 44, and 61 are so chosen that the time constant of discharge of capacitor 60 will be long. Then during the period of the pulse when the differential amplifiers 40 and 41 are conducting, diode 30 will remain cut off.

When clamping tube 20 is nonconducting, resistor 61 will provide a path for the direct component of current through diode 30.

While each of the amplifiers are conducting, the potential at the cathodes will adjust itself slightly more positive than the potential on the grids. When the grids are at ground potential, the maximum value of cathode resistor 44 is limited. With slight variations in the tube characteristics and the consequent variation in the conducting current, the percentage change in voltage across a small cathode resistor would change the linearity characteristics of the differential amplifiers and would not allow them to operate properly. It is therefore desirable to make cathode resistor 44 quite large and for the optimum condition it should be of the same order of magnitude as the plate load resistors. For a large cathode resistor and with the grids connected to ground potential, cathode resistor 44 must be returned to a negative potential B—. B— is taken from the anode potential, B+, power supply.

While there has been described hereinabove what is at present considered to be a preferred embodiment of this invention, it will be obvious to those skilled in the art that various changes and modifications may be made therein without departing from the scope of the invention as set forth in the appended claims.

What I claim is:

1. In combination an electrical comparator circuit containing a first and a second electron discharge device, each of said electron discharge devices containing at least a cathode, a control electrode, and an anode, said cathodes being returned to a negative potential through a resistor, a means for applying a first biasing direct voltage to each control electrode of said electron discharge devices, a means for applying a second direct voltage to the cathodes of said electron discharge devices, said biasing and second direct voltages coacting to make said electron discharge devices normally nonconducting, a means for applying a third direct voltage and an alternating voltage to the control electrode of one of said electron discharge devices, a means for applying a series of pulses synchronized with alternate peaks of said alternating voltage input to said electron discharge devices, said pulses acting to make said electron discharge devices conductive during the application of each pulse, a means for producing at each anode of said electron discharge devices over a complete cycle of said alternating voltage input a direct voltage output, said direct voltage output being indicative of the differential between the magnitude of said third direct voltage and the peak amplitude of said alternating voltage input.

2. In combination an electrical comparator circuit including a first and second normally nonconducting electron discharge device arranged to produce a direct current proportional to the difference between an applied direct current and the peak amplitude of an applied alternating current, a third electron discharge device including a cathode, an anode, and a control electrode, means for applying to said control electrode a series of pulses in synchronism with alternate peaks of said alternating current whereby said third electron discharge device is caused to conduct during the application of each pulse, a fourth electron discharge device containing at least an anode and a cathode, the anodes of said third and fourth electron discharge devices being connected together by a resistor which is shunted by a capacitor the cathode of said fourth electron discharge device being associated with said first and second electron discharge devices so that the latter two tubes are rendered conductive during at least a part of the application of each pulse to the control electrode of said third electron discharge device.

3. In combination, an electrical comparator circuit containing a first and a second electron discharge device, each electrical discharge device containing at least an anode, a control grid, and a cathode, a means for applying a variable direct voltage to each of said control grids, a means for applying a second direct voltage and a first alternating voltage to the control grid of only one of said electron discharge devices, means for causing both said electron discharge devices to be nonconductive during a first interval of said alternating voltage cycle, means for causing both said electron discharge devices to be conductive during a second interval of said alternating voltage cycle, means for taking the direct voltage output difference between the anodes of said electron discharge devices.

4. In combination, a servo system for controlling the rotation velocity of a shaft, said servo system including a comparator system, a direct current generator, a motor having a shaft for driving said generator means for applying a first direct voltage, a source of alternating voltage, and the direct voltage output of said generator to said comparator circuit, means included in said comparator circuit for comparing the peak amplitude of said alternating voltage input and said direct voltage output of said generator to give a direct voltage indicative of the difference between the two, means for applying said difference direct voltage output to control said motor, said motor and said generator being connected to said shaft.

5. An electrical comparator circuit comprising in combination, a first and second electron discharge device, each of said electron discharge devices containing at least a cathode, a control-electrode, and an anode, said cathodes being connected together and returned to a negative potential through a common load impedance, each of said anodes being returned to a source of positive potential through respective load impedances, a source of alternating current voltage, a source of direct current voltage, means for applying said alternating current voltage and said direct current voltage to the control-electrode of said first discharge device, means for returning the control-electrode of said second discharge device to a point of reference potential, coupling means normally effective in applying a positive potential to the cathodes of said first and second discharge devices to render said devices non-conducting, switching means coupled to said last mentioned means, and means controlling said switching means for rendering said coupling means periodically ineffective in synchronism with those amplitude peaks of said alternating current voltage which have a polarity opposite to the polarity of said direct current voltage, so that said first and second discharge devices are rendered conducting during said periods, whereby the voltage difference across said respective anodes is indicative of the difference between the magnitude of said direct current voltage and the peak amplitude of said alternating current voltage.

6. A comparator circuit according to claim 5 further comprising first and second sources of direct current voltage, and means for applying said first and second last named direct current voltages in series with the control-electrode-cathode circuits of said respective first and second discharge devices, whereby the optimum operating point of said first and second discharge devices is determined.

7. A comparator circuit according to claim 5, wherein said controlling means comprises a clipping amplifier including a third electron discharge device having at least a cathode, a control-electrode, and an anode, means for applying a second alternating current voltage having a given phase relation with respect to said first alternating current voltage to the control-electrode-cathode circuit of said third discharge device, said second alternating current voltage having a magnitude great enough to overdrive said clipping amplifier to produce a gating pulse output therefrom in synchronism with those amplitude peaks of said first alternating voltage which have the same polarity as the polarity of said direct current voltage; wherein said switching means comprises a fourth normally non-conducting electron discharge device having at least a cathode connected to a point of reference potential, a control-electrode, and an anode, a load impedance connecting the anode of said fourth discharge device to said second-mentioned source of positive potential, means for coupling the control-electrode-cathode circuit of said fourth discharge device to the output of said clipping amplifier to effect conduction therethrough in response to said gating pulses; and wherein said coupling means comprises said load impedance of said switching means, and a fifth discharge device having at least a cathode connected to the cathodes of said first and second discharge devices, and an anode, and a load impedance connected between the anode of said fifth discharge device and the anode of said fourth discharge device.

8. An electrical comparator, comprising in combination first and second amplifiers, each amplifier including respectively a normally non-conducting electron discharge device having at least a cathode, a control-electrode, and an anode, a source of direct current voltage, a source of alternating current voltage, means for impressing said direct current voltage and said alternating current voltage on the cathode-control-electrode circuit of said first amplifier, and gating means coupled respectively to said first and second amplifiers to effect the conduction thereof in synchronism with those amplitude peaks of said alternating current voltage which have a polarity opposite to the polarity of said direct current voltage, whereby the difference in outputs of said first and second amplifiers indicates the difference between the peak amplitude of said alternating current voltage and the magnitude of said direct current voltage.

9. A servo-mechanism comprising in combination a motor having a shaft which rotates at a speed which is a function of the energization of said motor, a generator driven by said shaft for generating a direct current voltage having a magnitude which is a function of the speed of said shaft, a source of alternating current voltage, a normally non-conducting servo-amplifier, means for impressing said direct current voltage and said alternating current voltage in series as inputs to said servo-amplifier, means coupled between said source of alternating current voltage and said servo-amplifier for rendering said servo-amplifier conducting on alternate half-cycle peak amplitudes of said alternating current voltage having a polarity opposite to said direct current voltage, and means for applying said servo-amplifier output voltage to said motor to effect the energization thereof, whereby the speed of said shaft is determined by the peak amplitude of said alternating current voltage.

10. In combination, first and second normally non-operating amplifying means having substantially the same amplifying characteristics, a source of alternating voltage, means for rendering said first and second amplifying means operating in synchronism with a predetermined angular value of said alternating voltage, each of said amplifying means when rendered operating having normally the same given output, a source of direct current voltage having a given magnitude, means for applying said alternating voltage and said direct current voltage to said first translating means for altering the output thereof as a function of the magnitude of said direct current voltage and the instantaneous amplitude of said alternating voltage at said predetermined value, whereby the difference between the outputs of said first and second amplifying means is an indication of the difference between the magnitude of said direct current voltage and said instantaneous amplitude of said alternating voltage.

11. A combination according to claim 10, wherein said predetermined angular value of said alternating voltage is at given peak amplitudes thereof.

12. A combination according to claim 10 wherein said first and second amplifying means comprise respectively first and second normally non-conducting electron discharge devices, each of said discharge devices having substantially the same characteristics.

13. In combination, a normally non-operating amplifying means, a load impedance in series with said amplifying means, a source of direct current voltage, a source of alternating current voltage, means for applying said direct current voltage and said alternating current voltage to said amplifying means, means for rendering said amplifying means operating in synchronism only with a particular predetermined angular value of said alternating current voltage, whereby the magnitude of the voltage across said load impedance is indicative of the difference between the magnitude of said direct current voltage and the instantaneous amplitude of said alternating current voltage at said predetermined angular value.

14. A combination according to claim 13, wherein said predetermined angular value of said alternating current voltage is at given peak amplitudes thereof.

15. A combination according to claim 14, wherein said amplifying means comprises a normally nonconducting discharge device.

JOHN W. GRAY.

References Cited in the file of this patent
UNITED STATES PATENTS

| Number | Name | Date |
| --- | --- | --- |
| 1,985,003 | Von Engel et al. | Dec. 18, 1934 |
| 2,265,996 | Blumlein | Dec. 16, 1941 |
| 2,448,793 | Glass | Sept. 7, 1948 |